United States Patent
Choi et al.

(10) Patent No.: US 11,782,552 B2
(45) Date of Patent: Oct. 10, 2023

(54) CAPACITIVE TOUCH PANEL AND METHOD OF DRIVING CAPACITIVE TOUCH PANEL

(71) Applicant: Samsung Electronics Co., Ltd., Suwon-si (KR)

(72) Inventors: Yoon Kyung Choi, Seoul (KR); Jun Chul Park, Daegu (KR); Jin Bong Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 265 days.

(21) Appl. No.: 16/670,367

(22) Filed: Oct. 31, 2019

(65) Prior Publication Data

US 2020/0218421 A1 Jul. 9, 2020

(30) Foreign Application Priority Data

Jan. 7, 2019 (KR) ........................ 10-2019-0001713

(51) Int. Cl.
 *G06F 3/041* (2006.01)
 *G06F 3/044* (2006.01)

(52) U.S. Cl.
 CPC ........ *G06F 3/04166* (2019.05); *G06F 3/0446* (2019.05); *G06F 2203/04112* (2013.01)

(58) Field of Classification Search
 CPC .................. G06F 3/044–0448; G06F 3/04166
 See application file for complete search history.

(56) References Cited

U.S. PATENT DOCUMENTS

| | | | |
|---|---|---|---|
| 9,141,244 B2 | 9/2015 | Maeda et al. | |
| 9,778,713 B2 | 10/2017 | Reynolds et al. | |
| 2012/0013563 A1 | 1/2012 | Chou et al. | |
| 2014/0152621 A1* | 6/2014 | Okayama | G06F 3/0446 |
| | | | 345/174 |
| 2015/0277618 A1 | 10/2015 | Bulea | |
| 2016/0188036 A1 | 6/2016 | Ahn et al. | |
| 2016/0357342 A1* | 12/2016 | Olley | G06F 3/0446 |
| 2017/0293388 A1 | 10/2017 | Han et al. | |
| 2017/0364184 A1 | 12/2017 | Weinerth et al. | |
| 2017/0364185 A1 | 12/2017 | Myren et al. | |

FOREIGN PATENT DOCUMENTS

| JP | 6334157 B2 | 5/2018 |
|---|---|---|
| KR | 10-2015-0077162 A | 7/2015 |
| KR | 101620830 B1 | 5/2016 |

* cited by examiner

*Primary Examiner* — Hang Lin
(74) *Attorney, Agent, or Firm* — Harness, Dickey & Pierce, P.L.C.

(57) ABSTRACT

A capacitive touch panel includes a plurality of x-line channels extending in a first direction, a plurality of y-line channels extending in a second direction, different from the first direction, and processing circuitry configured to apply a first voltage to the x-line channels, apply a second voltage to the y-line channels, the first voltage and the second voltage having opposite phases to each other, and sense a contact on at least one of intersections of the plurality of x-line channels and the plurality of y-line channels.

9 Claims, 9 Drawing Sheets

CAPACITIVE TOUCH PANEL AND METHOD OF DRIVING CAPACITIVE TOUCH PANEL

CROSS-REFERENCE TO RELATED APPLICATION(S)

This application claims benefit of priority to Korean Patent Application No. 10-2019-0001713 filed on Jan. 7, 2019 in the Korean Intellectual Property Office, the disclosure of which is incorporated herein by reference in its entirety.

BACKGROUND

1. Field

The present inventive concepts relate to a capacitive touch panel and/or a method of driving the same.

2. Description of Related Art

In general, a touchscreen panel is a screen equipped with a special input device to receive a touch position when the screen is touched by a hand. When a person's hand or an object touches a character or a specific position on the screen, input data is directly received on the screen, such that a touch position is determined, allowing specific processing to be performed by stored software.

Mobile devices such as smartphones, and the like, have rapidly spread in recent years. Such mobile devices employ touch sensors to implement various functions. Methods of recognizing a touch by a touch sensor may be classified as a resistance film method and a capacitive method.

A capacitive touch-screen panel employs a method using electrostatic capacitance of a human body. Such a method is classified as a touch recognition method, in which variations of resistance and current, generated by capacitance of a human body, are measured, to recognize a touch and a capacitive touch sensing method in which charged amounts of a capacitor are compared with each other to determine whether there has been a touch.

However, when an earth ground state of a user using a device or a device used by a user is poor, accuracy may become unreliable or degraded. For example, when a user places a device such as a smartphone on a bed without holding the smartphone and touches the screen with only a finger, the user and the device are separated from an earth ground by a bed mattress, a nonconductive object, and the user and the device are mutually grounded through a grip. A condition, in which an earth ground state of the user or the device is poor, is referred to as a low ground mass (LGM) condition. In this case, there is a high possibility of degradation in touch performance.

SUMMARY

Example embodiments of the present inventive concepts provide a capacitive touch panel configured to reduce or prevent sensitivity from being deteriorated, even when a ground earth state is poor, and a method of driving the capacitive touch panel.

According to some example embodiments of the present inventive concepts, a capacitive touch panel includes a plurality of x-line channels extending in a first direction, a plurality of y-line channels extending in a second direction, different from the first direction, and a processing circuitry configured to apply a first voltage to the x-line channels, apply a second voltage to the y-line channels, the first voltage and the second voltage having opposite phases to each other, and sense a contact on at least one of intersections of the plurality of x-line channels and the plurality of y-line channels.

According to some example embodiments of the present inventive concepts, a capacitive touch panel includes a plurality of x-line channels formed in a first direction, a plurality of y-line channels formed in a second direction, different from the first direction, the plurality of y-line channels intersecting the plurality of x-line channels to form intersections, and the intersections include a first intersection group and a second intersection group, and processing circuitry configured to sense a contact on at least one of the intersections, apply a first voltage to intersections included in the first intersection group, and apply a second voltage to intersections included in the second intersection group, the first voltage and the second voltage having opposite phases to each other.

According to some example embodiments of the present inventive concepts, a method of driving a capacitive touch panel including a plurality of x-line channels extending in a first direction and a plurality of y-line channels extending in a second direction, different from the first direction, the method including includes, applying a first voltage to the x-line channels and a second voltage to the y-line channel, the first and second voltage having opposite phases to each other, and sensing a contact on at least one of the intersections of the plurality of x-line channels and the plurality of y-line channels.

According to some example embodiments of the present inventive concepts, a method of driving a capacitive touch panel including a plurality of x-line channels extending in a first direction, and a plurality of y-line channels extending in a second direction, different from the first direction, the method includes, applying a first voltage to intersections included in a first intersection group, and a second voltage to intersections included in a second intersection group, and sensing a contact on at least one of intersections of the plurality of x-line channels and the plurality of y-line channels.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, some example embodiments of the present inventive concepts will be described with reference to the accompanying drawings.

As described above, touch performance is degraded under LGM conditions. This is because a touch sensing driving signal for measuring variations in capacitance is coupled to a user's finger (body) to induce a voltage having the same phase as a sensor driving voltage to user's finger (body), and the induced voltage causes a side effect in which unwanted charges are introduced to a readout path of a touch sensor through coupling capacitance between the touch sensor and the finger, to have an effect on touch performance. Meanwhile, when ground states of the user and the device is good, the touch sensing driving signal does not cause significant coupling to occur in the user's body.

In particular, in the case of self-capacitance sensing, the magnitude of a voltage applied to coupling capacitance between a finger and a sensor is reduced due to the above-described phenomenon under the LGM condition to lower touch sensitivity. The degree of inducing a sensor driving voltage to a user's body and the degree of affecting a touch sensor by the induced voltage vary, depending on a thickness of a cover window (usually tempered glass or reinforced plastic) between the touch sensor and the finger.

Some example embodiments of the present inventive concepts propose a capacitive touch panel and a method of driving the same.

Figure 1:
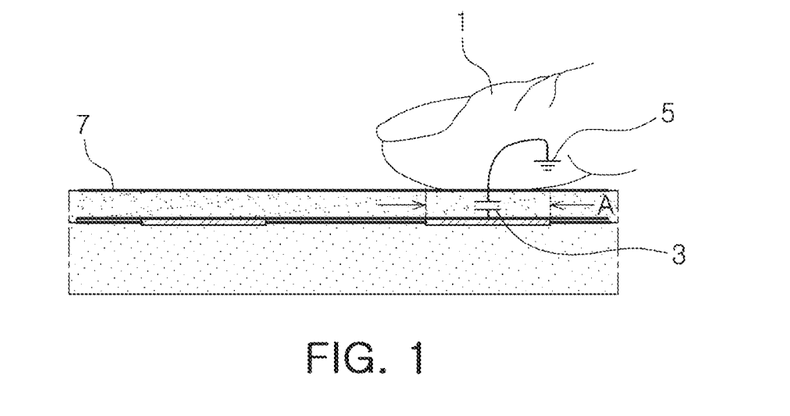
FIG. 1 is a schematic diagram illustrating variations in self-capacitance of a touch sensor depending on a touch.
Figure 2:
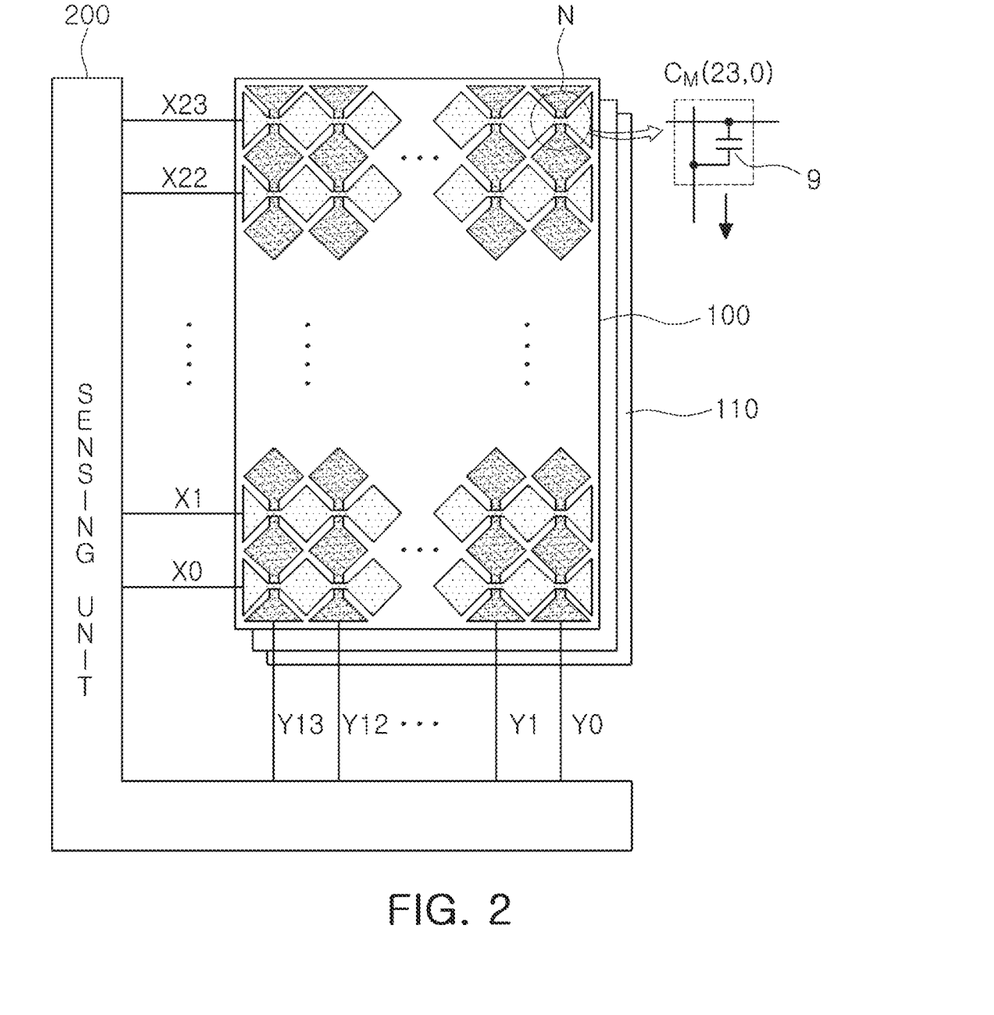
FIG. 2 is a schematic diagram illustrating a configuration of a line-type touch sensor.
Figure 3:
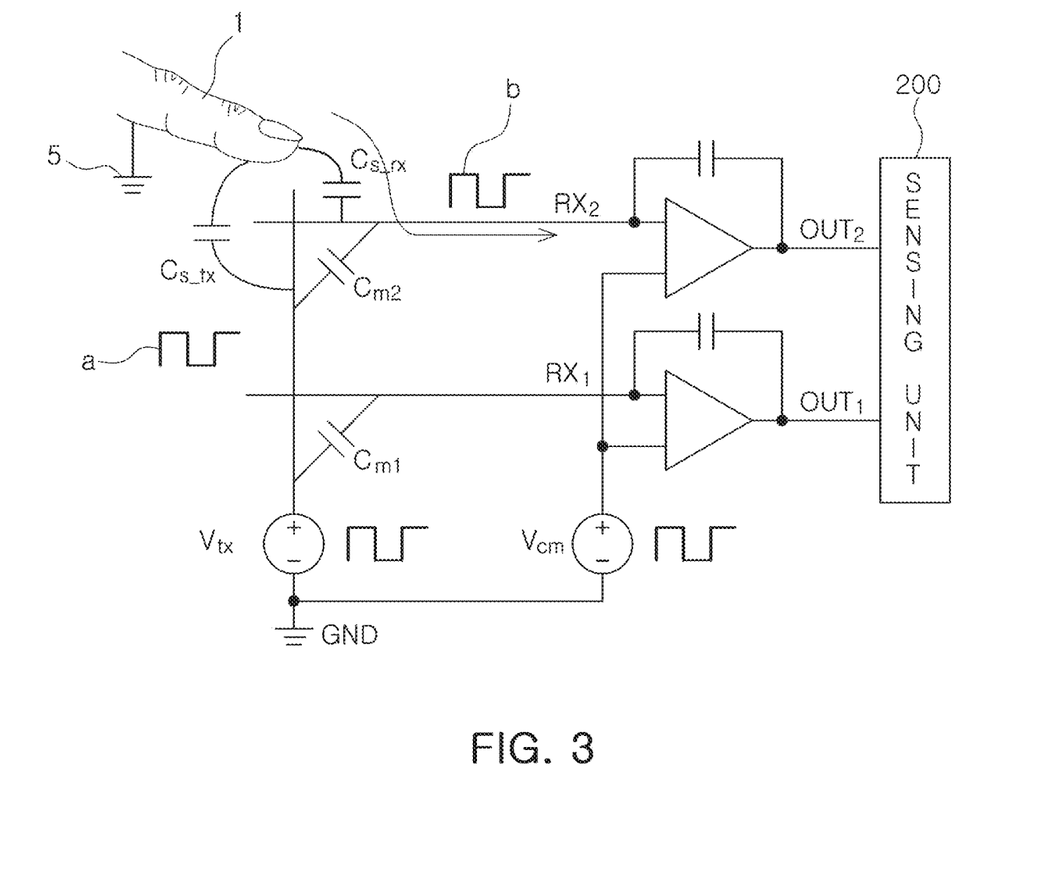
FIG. 3 is a schematic diagram illustrating a typical self-capacitance sensing method.
Figure 4:
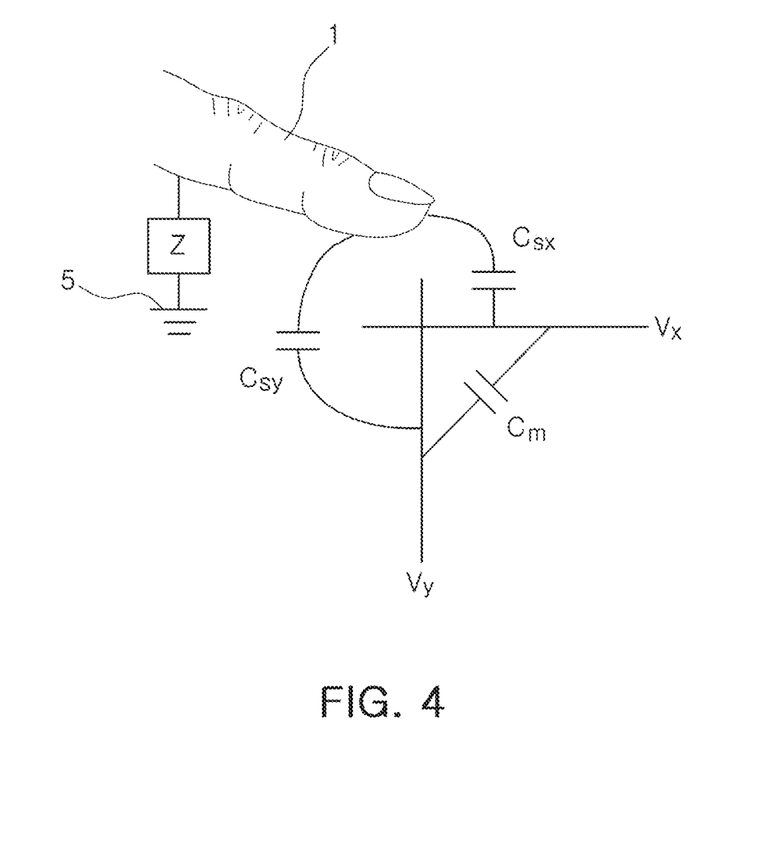
FIG. 4 is a schematic diagram illustrating low ground mass (LGM) conditions which may occur during sensing of self-capacitance.

FIG. 1 is a schematic diagram illustrating variations in self-capacitance of a touch sensor depending on a touch, and FIG. 2 is a schematic diagram illustrating a configuration of a line-type touch sensor. FIG. 3 is a schematic diagram illustrating a typical self-capacitance sensing method, and FIG. 4 is a schematic diagram illustrating low ground mass (LGM) conditions which may occur during sensing of self-capacitance.

Capacitance is inversely proportional to a distance between two conductors and is proportional to an area of the two conductors. As illustrated in FIG. 1, when a conductor 1, such as a finger or a stylus pen, approaches a touch sensor electrode, a contact area 'A', formed between the finger and the touch sensor electrode, causes self-capacitance of the touch sensor electrode to be increased while increasing capacitance 3. Such a phenomenon may be used to form a plurality of touch sensor electrode arrays, and variations in capacitance of each electrode may be measured to estimate a position at which the finger 1 or the like contacts a touch panel.

As a method of forming a plurality of electrode arrays in a touch panel 100, in general, line sensor arrays 10 and 20 spaced apart by the same distance may be formed to be orthogonal to each other, as illustrated in FIG. 2.

Referring to FIG. 2, as illustrated by $C_M(23,0)$, there is mutual capacitance 9, parasitic capacitance formed at an intersection N of an x-line sensing channel and a y-line sensing channel. The mutual capacitance varies as a finger approaches, and is decreased in a direction opposite to the self-capacitance. In addition, an amount of variations in capacitance, as the finger 1 or the like approaches, changes depending on a shape of a sensor pattern, a structure of a vertical stack, or the like. However, an amount of variations in self-capacitance tends to be significantly greater (for example, about 10 times greater) than an amount of variations in mutual capacitance.

Referring to FIG. 3, a widely used method of reading variations in capacitance of a touch sensor on a touch panel includes applying a change in a constant voltage to both ends of capacitance to be measured and measuring the amount of charges generated at this point. Besides self-capacitances Cs_tx and Cs_rx to be measured, a Tx sensing voltage 'a' is reduced to be equivalent to an Rx sensing voltage 'b' in such a manner that mutual capacitance Cm2, parasitic capacitance, does not affect the amount of charges on reading paths Rx2 and OUT2. Thus, potential at both ends of the mutual capacitance Cm2 remains constant during a period in which the potential is sensed.

However, a voltage of a finger 1 is affected by a sensor driving voltage under an LGM condition in which a ground state of a user or the like is poor.

Referring to FIG. 4, impedance, represented by Z, between a user 1 and an earth ground 5 may be about 200 picofarads (pF) in typical use conditions, but Csy and Csx may be only about 1 pF. Accordingly, as can be seen from Equation (1) below, potential $V_B$ of the finger 1 is not significantly affected by potentials Vx and Vy, for example, Vtx.

$$V_B = \frac{C_{SY} \cdot V_Y + C_{SX} \cdot V_X}{Z + C_{SY} + C_{SX}} = \frac{1}{1 + Z/(C_{SY} + C_{SX})} \cdot V_{TX} \quad \text{Equation (1)}$$

However, when the impedance Z is reduced to a level of several pF, similar to Csy and Csx, such as under LGM conditions, the potential $V_B$ of the finger 1 is affected by Vtx and a voltage having the same phase as Vtx appears in a low-frequency band, a touch sensing frequency (less than 500 KHz) band.

Consequently, the voltage applied to Csx is not Vtx and is reduced by the potential $V_B$ of the finger 1 at Vtx. As a result, the amount of the sensed charge is reduced from Csx*Vtx to Csx*(Vtx−VB) and may deteriorate sensing sensitivity. Some example embodiments of the present inventive concepts propose a driving method of reducing or preventing such sensitivity deterioration in an LGM state.

Figure 5:
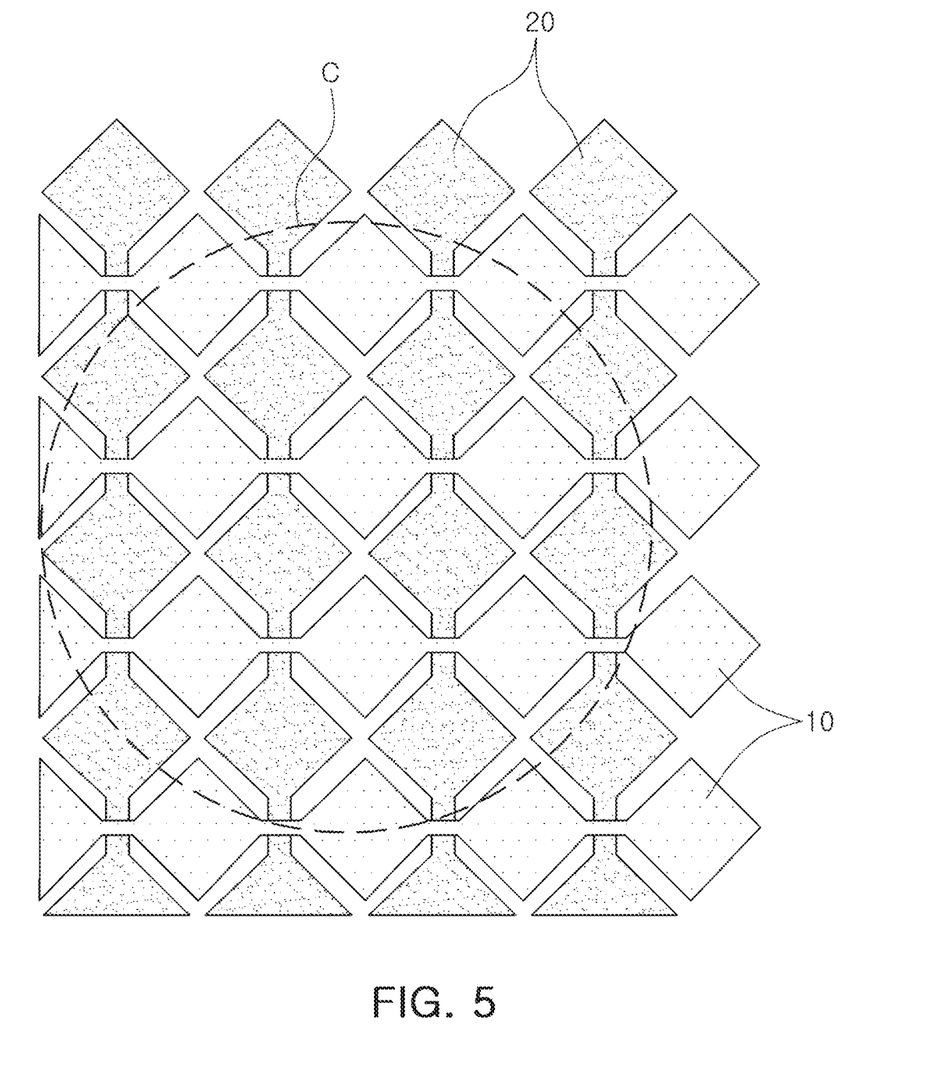
FIG. 5 is a schematic diagram illustrating a line-type capacitive touch panel among capacitive touch panels according to some example embodiments of the present inventive concepts.
Figure 6:
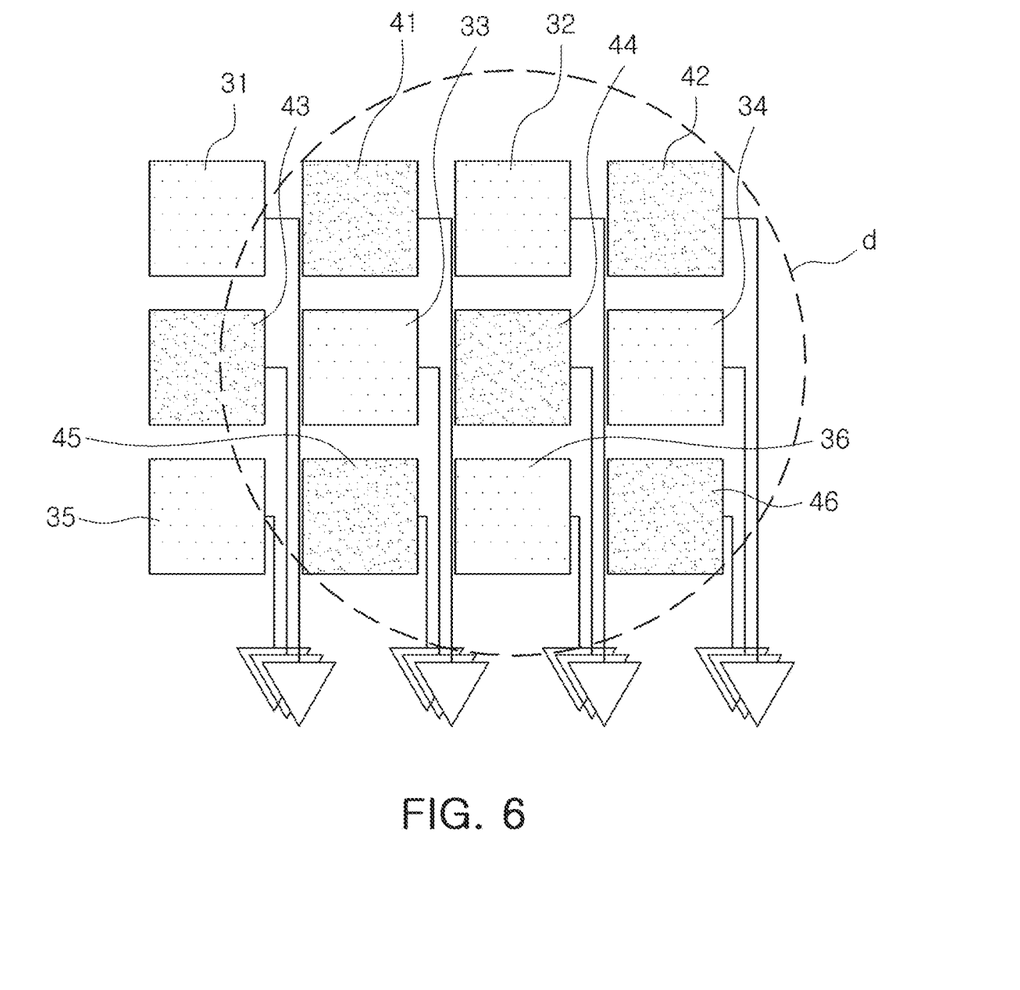
FIG. 6 is a schematic diagram illustrating a dot-type capacitive touch panel among capacitive touch panels according to some example embodiments of the present inventive concepts.

FIG. 5 is a schematic diagram illustrating a line-type capacitive touch panel among capacitive touch panels according to some example embodiments of the present inventive concepts, and FIG. 6 is a schematic diagram illustrating a dot-type capacitive touch panel among capacitive touch panels according to some example embodiments of the present inventive concepts.

A capacitive touch panel according to some example embodiments includes a plurality of x-line channels extending in a first direction, a plurality of y-line channels extending in a second direction, different from the first direction, and/or a sensing unit 200 configured to sense a contact occurring at intersections of the plurality of x-line channels and the plurality of y-line channels. The sensing unit 200 may apply voltages having opposite phases to the x-line channel and the y-line channel to sense the contact The sensing unit 200 may be implemented using processing circuitry, such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Referring to FIG. 5, a capacitive touch panel according to some example embodiments includes a plurality of x-line channels 10 extending in a first direction and a plurality of y-line channels 20 extending in a second direction, different from the first direction. As described with reference to FIGS. 3 and 4 or the like, a contact, occurring at intersections of the plurality of x-line channels 10 and the plurality of y-line channels 20, is sensed.

In the case that a distance between the plurality of x-line channels 10 and a distance between the plurality of y-line channels 20 are equal to each other, when an input means such as a finger, a stylus pen, or the like touches a touch panel, the number of x sensors and the number of y sensors, included in a region overlapping a contact area of the finger or the like on the touch panel, may be substantially the same. Since self-capacitance, formed when each sensor overlaps the finger, is proportional to the overlapping area, Csy and Csx are substantially the same.

Such a relationship is established more accurately because the number of units of an incorporated sensor is increased as an area, in which an input means such as a finger, an input pen, or the like contacts the touch panel, is increased. For example, it will be assumed that circles "c" and "d" illustrated in FIGS. 5 and 6 are areas in which a finger or the like contacts the touch panel. As illustrated in FIGS. 5 and 6, a distance between sensors is determined in such a manner that three or more sensor lines react during a typical touch. Therefore, the condition may be considered to be valid with respect to a typical touch.

Returning to FIGS. 3 and 4, when Vy is applied in the same magnitude and opposite phase as Vx in self-capacitance sensing using the foregoing, $V_B$ may be set to zero (0) or close to zero (0) in the above-mentioned Equation (1). In this case, since the voltage $V_B$ is not fluctuated by Vtx even in an LGM state, the amount of sensed charges is maintained at Csx*Vtx irrespective of the LGM state. Thus, sensitivity deterioration may be reduced or prevented in LGM conditions. Accordingly, in the capacitive touch panel according to some example embodiments, a sensing unit 200 applies voltages having opposite phases, not the same phase, to an x-line channel and a y-line channel to sense whether there is a touch.

When voltages having opposite phases are applied to the x-line channel and the y-line channel, voltages at both ends of mutual capacitance Cm are interchanged. Therefore, sensitivity may be slightly reduced by an influence of the mutual capacitance Cm as compared to a case in which voltages having the same phase are applied to the x-line channel and the y-line channel. However, since the variations in the mutual capacitance Cm are only one-tenth (1/10) of variations in self-capacitance while contacting the touch panel, sensitivity reduction caused by the mutual capacitance Cm is significantly lower.

There may be a case in which an x-line sensor and a y-line sensor are designed to have different unit sensor shapes.

This causes self-capacitances to be different from each other (Csy≠Csx). Even in this case, there may be the same pattern in which unit sensors are repeatedly arranged at regular intervals. Accordingly, a relationship of Csx=K*Csy may be established with respect to a typical touch event, in which voltages having the same phase are applied to an x-line channel and a y-line channel, irrespective of a touch point. For example, the sum of x-line self-capacitance, present at an intersection between a plurality of channels included in a contact area, is K times the sum of y-line self-capacitances present at a plurality of intersections. In some example embodiments, in this case, a sensing unit 200 may apply a voltage, which is 1/k times an absolute value of a voltage applied to the y-line channel, to the x-line channel. For example, a relationship between the voltage applied to the y-line channel by the sensing unit 200 and the voltage applied to the x-line channel by the sensing unit 200 may be established as Vy=−(K*Vx), where K is a real number greater than zero.

In this case, the above-described Equation (1) may be developed as illustrated in Equation (2) below, such that the voltage $V_B$ is rendered zero.

$$V_B = \frac{C_{SY} \cdot V_Y + C_{SX} \cdot V_X}{Z + C_{SY} + C_{SX}} = \frac{-C_{SY} \cdot K \cdot V_X + K \cdot C_{SY} \cdot V_X}{Z + C_{SY} + C_{SX}} = 0 \quad \text{Equation (2)}$$

In the case in which a plurality of x-line channels are equally spaced apart from each other and a plurality of y-line channels are equally spaced apart from each other, the interval of the plurality of x-line channels may be different from the interval of the plurality of y-line channels. In a capacitive touch panel according to some example embodiments, when the interval of the plurality of x-line channels is K times the interval of the plurality of y-line channels, the sensing unit 200, not illustrated, may apply a voltage, which is K times an absolute value of the voltage applied to the x-line channel, to the y-line channel. Accordingly, the voltage $V_B$ may also be rendered zero in the above-mentioned Equation (2).

In the above-described example embodiments, irrespective of whether a device including the capacitive touch panel or a user using the device belongs to an LGM state, voltages having opposite phases are applied to the x-line channel and the y-line channel to sense a contact. However, in some example embodiments, a sensing unit 200 may sense a contact by further including a period in which voltages having the same phase are applied to an x-line channel and a y-line channel, in addition to a period in which voltages having opposite phases are applied to the x-line channel and the y-line channel.

According to some example embodiments, rather than always sensing a contact by additionally setting periods in which voltages of the same phase and voltages having opposite phases are applied to an x-line channel and a y-line channel, a sensing unit 200 may further include a period, in which voltages having opposite phases are applied to the x-line channel and the y-line channel, only when it is determined that a state of a device including a capacitive touch channel and a user using the device belongs to an LGM state, for example, only when it is determined that a part of a human body contacting the panel is affected by a voltage applied by the sensing unit 200.

In FIG. 5 and the related description, a line-type sensing driving method has been described as an example. However, operations similar to those of the above-described method may be performed in a dot-type sensing driving method illustrated in FIG. 6. For example, a capacitive touch panel according to some example embodiments includes a plurality of x-line channels, formed in a first direction, a plurality of y-line channels, formed in a second direction, different from the first direction, and/or a sensing unit 200 configured to sense a contact occurring at intersections of the plurality of x-line channels and the plurality of y-line channels. The intersections include a first intersection group and a second intersection group. The sensing unit 200 may apply voltages having opposite phases to intersections included in the first intersection group, and intersections included in the second intersection group, to sense the contact.

Referring to FIG. 6, intersections of a plurality of x-line channels and a plurality of y-line channels are defined by a first intersection group (31, 32, 33, 34, 35, and 36) and a second intersection group (41, 42, 43, 44, 45, and 46). As illustrated in FIG. 6, intersections 31, 32, 33, 34, 35, and 36 included in the first intersection group and intersections 41, 42, 43, 44, and 45 included in the second intersection group, may be alternately arranged in a first direction and a second direction.

The sensing unit 200 may apply voltages having opposite phases to the intersections 31, 32, 33, 34, 35 and 36 included in the first intersection group, and the intersections 41, 42, 43, 44, 45, and 46 included in the second intersection group, such that $V_B$, a potential of a user's finger 1, is rendered zero (0) to sense a contact.

Similarly to the description in what has been described in connection with FIG. 5 and the related description, when the sum of self-capacitances, present at the intersections 32, 33, 34, and 36 of the first intersection group included in a contact area is K times the sum of self-capacitances, present at the intersections 41, 42, 44, 45, and 46 of the second intersection group, a sensing unit 200 may apply a voltage, which is 1/K times an absolute value of a voltage applied to the intersections 41, 42, 44, 45, and 46 of the second intersection group, to the intersections 32, 33, 34, and 36 of the first intersection group, to sense a contact.

In the some example embodiments, irrespective of whether a state of a device including a capacitive touch panel and a user using the device belongs to an LGM state, voltages having opposite phases are applied to intersections included in a first intersection group, and intersections included in a second intersection group, to sense a contact. However, in some example embodiments, a sensing unit 200 may sense a contact by further including a period, in which voltages having the same phase are applied to intersections included in a first intersection group, and intersections included in a second intersection group, to sense a contact, in addition to a period in which voltages having opposite phases are applied to intersections included in the first intersection group, and intersections included in the second intersection group, to sense a contact.

According to some example embodiments, rather than always sensing a contact by additionally setting periods in which voltages of the same phase and voltages having opposite phases are applied to intersections included in a first intersection, and intersections belonging to a second intersection group, a sensing unit 200 may further include a period in which voltages having opposite phases are applied to the intersections included in the first group, and the intersections included in the second intersection group, only when it is determined that a state of a device including a capacitive touch channel and a user using the device belongs to an LGM state, for example, only when it is determined that a part of a human body contacting the panel is affected by a voltage applied by the sensing unit 200.

Figure 7:
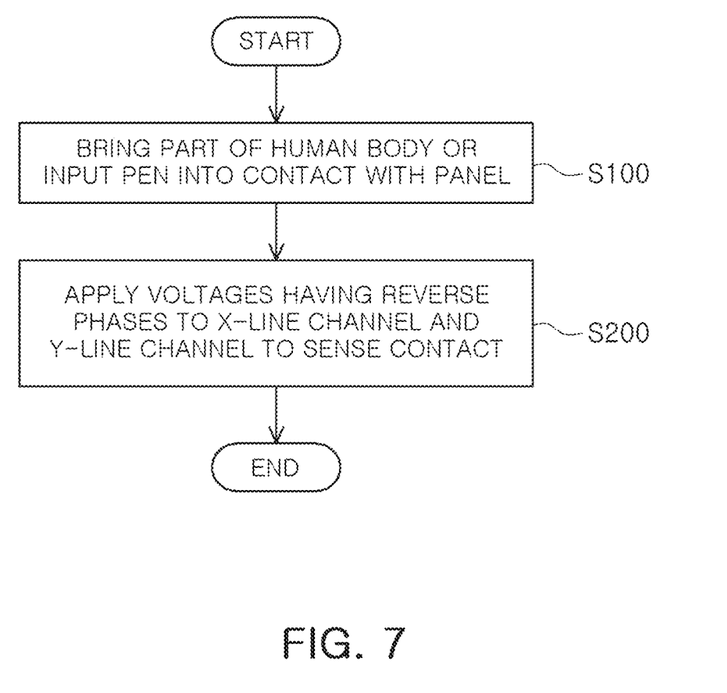
FIG. 7 is a flowchart illustrating a method of driving a capacitive touch panel according to some example embodiments of the present inventive concepts.
Figure 8:
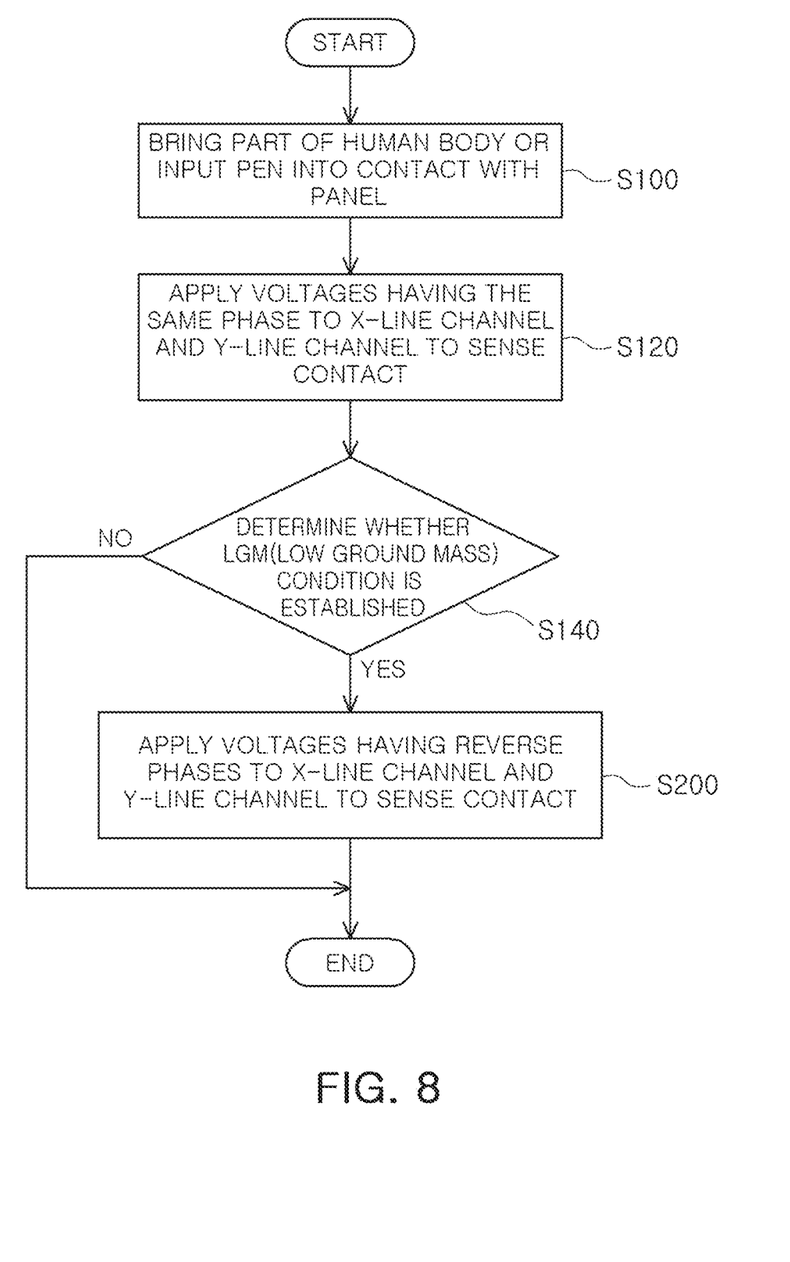
FIG. 8 is a flowchart illustrating a method of driving a capacitive touch panel according to some example embodiments of the present inventive concepts.

FIG. 7 is a flowchart illustrating a method of driving a capacitive touch panel according to some example embodiments of the present inventive concepts, and FIG. 8 is a flowchart illustrating a method of driving a capacitive touch panel according to some example embodiments of the present inventive concepts.

A method of driving a capacitive touch panel according to some example embodiments may include, in a capacitive touch panel including a plurality of x-line channels extending in a first direction, a plurality of y-line channels extending in a second direction, different from the first direction, and/or a sensing unit 200 configured to sense a contact occurring at intersections of the plurality of x-line channels and the plurality of y-line channels, bringing a part of a human body or an input pen into contact with the panel (S100) and applying voltages having opposite phases to the x-line channel and the y-line channel by the sensing unit 200 to sense the contact (S200).

According to some example embodiments, the method may further include applying voltages having the same phase to the x-line channel and the y-line channel by the sensing unit 200 to sense the contact (S120), in addition to the applying voltages having opposite phases to the x-line channel and the y-line channel by the sensing unit 200 to sense the contact (S200). The operations S120 and S200 may be performed in reverse order.

According to some example embodiments, as illustrated in FIG. 8, a determination is made as to whether a low ground mass (LGM) condition, in which a part of a human body contacting a panel is affected by a voltage applied by a sensing unit 200, is established (S140). Only when the determination is YES, may the operation S200 be performed.

Since the method of driving a capacitive touch panel, described with reference to FIGS. 7 and 8, may be understood with reference to FIGS. 3 to 5 and the corresponding descriptions of the line-type capacitive touch panel, it will be omitted herein to avoid duplicate descriptions.

Figure 9:
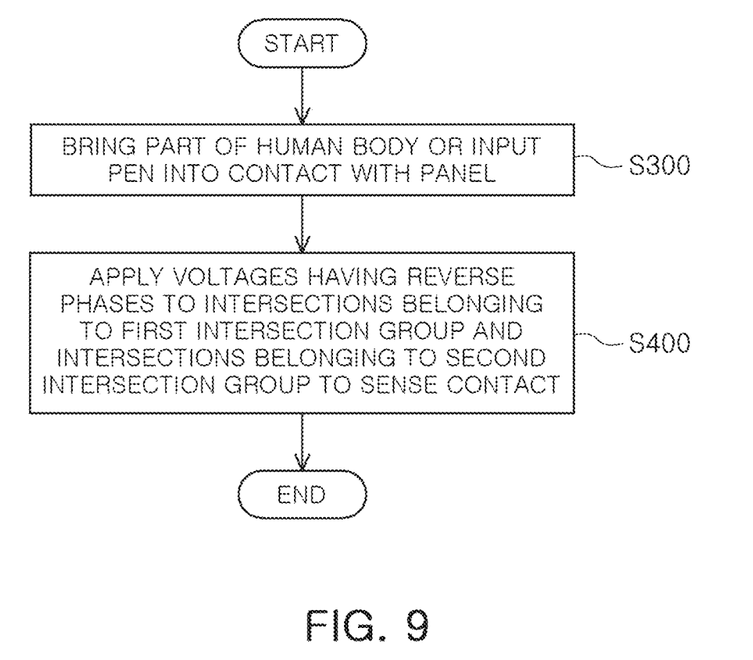
FIG. 9 is a flowchart illustrating a method of driving a capacitive touch panel according to some example embodiments of the present inventive concepts.
Figure 10:
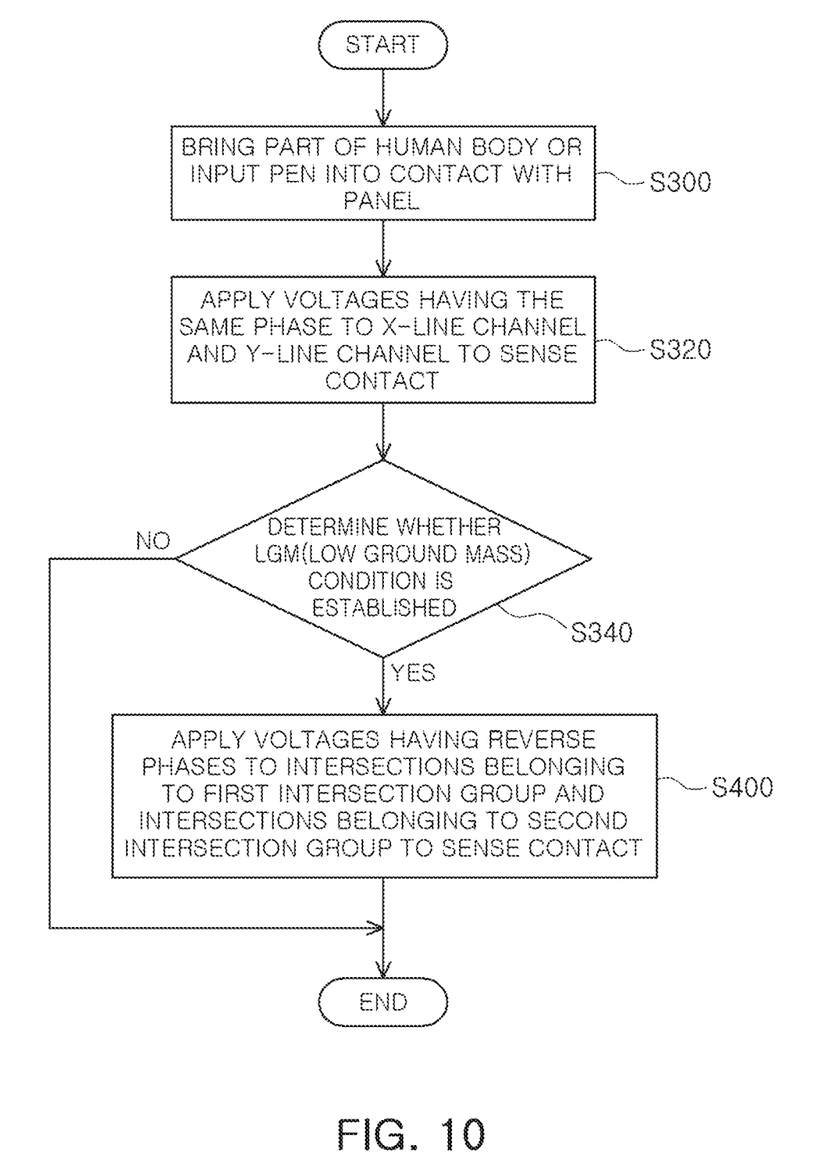
FIG. 10 is a flowchart illustrating a method of driving a capacitive touch panel according to some example embodiments of the present inventive concepts.

FIG. 9 is a flowchart illustrating a method of driving a capacitive touch panel according to some example embodiments of the present inventive concepts, and FIG. 10 is a flowchart illustrating a method of driving a capacitive touch panel according to some example embodiments of the present inventive concepts.

A method of driving a capacitive touch panel according to some example embodiments may include, in a capacitive touch panel including a plurality of x-line channels extending in a first direction, a plurality of y-line channels extending in a second direction, different from the first direction, and/or a sensing unit 200 configured to sense a contact occurring at intersections of the plurality of x-line channels and the plurality of y-line channels, bringing a part of a human body or an input pen into contact with a panel (S300) and applying voltages having opposite phases to intersections included in a first intersection group, and intersections included in a second intersection group, to sense the contact (S400).

According to some example embodiments, the method may further include applying voltages having the same phase to the intersections included in the first intersection group, and the intersections included in the second intersection group, to sense the contact (S320) in addition to the applying voltages having opposite phases to intersections included in a first intersection group, and intersections included in a second intersection group, to sense the contact (S400). The operations S320 and S400 may be performed in reverse order.

According to some example embodiments, as illustrated in FIG. 10, a determination is made as to whether a low ground mass (LGM) condition, affected by a voltage applied to a part of a human body contacting a panel by a sensing unit 200, is established (S340). Only when the determination is YES, may the operation S400 be performed.

Since the method of driving a capacitive touch panel, described with reference to FIGS. 9 and 10, may be understood with reference to FIGS. 3, 4, and 6 and the corresponding descriptions of the line-type capacitive touch panel, it will be omitted herein to avoid duplicate description.

The term "unit," for example, "module" or "table" used in the some example embodiments may refer to software entries, and hardware entries such as a field programmable gate array (FPGA) or an application specific integrated circuit (ASIC), and the module performs certain functions. The module is not meant to be limited to software or hardware entries. The module may be configured to be stored on an addressable storage medium, and configured to play one or more processors. The module may include entries such as software entries, object-oriented software entries, class entries, and task entries, and processes, functions, attributes, procedures, subroutines, segments of program code, drivers, firmware, microcode, circuitry, data, databases, data structures, tables, arrays, and variables, as will be appreciated by those skilled in the art. The functions provided in the entries and modules may be combined into a smaller number of entries and modules, or may be further separated into additional entries and modules. In addition, entries and modules may be implemented to reproduce one or more CPUs in the device.

According to the above-described capacitive touch panel and a driving method of the same, touch sensitivity of a capacitive touch sensor may be reduced or prevented from being deteriorated when a ground state of a user or a device is poor.

While some example embodiments have been shown and described above, it will be apparent to those skilled in the art that modifications and variations could be made without departing from the scope of the present inventive concepts as defined by the appended claims.

What is claimed is:

1. A capacitive touch panel comprising:
a plurality of x-line channels extending in a first direction;
a plurality of y-line channels extending in a second direction, different from the first direction; and
processing circuitry configured to
apply a first voltage to the x-line channels,
apply a second voltage to the y-line channels, the first voltage and second voltage having the same phase,
determine that a part of a human body, being in contact with the capacitive touch panel, is affected by a voltage applied by the processing circuitry,
switch from applying the first voltage to the x-line channels to applying a third voltage to the x-line channels and switch from applying the second voltage to the y-line channels to applying a fourth voltage to the y-line channels in response to determining that the part of the human body is affected by the voltage, the third voltage and the fourth voltage having opposite phases to each other, and
sense a contact on at least one of intersections of the plurality of x-line channels and the plurality of y-line channels.

2. The capacitive touch panel of claim 1, wherein
an interval between the plurality of x-line channels is K times of an interval between the plurality of y-line channels, where K is a real number greater than 0, and
an absolute value of the first voltage is equal to K times of an absolute value of the second voltage.

3. The capacitive touch panel of claim 1, wherein
a sum of x-line self-capacitances present in the intersections included in an area of the contact is K times of a sum of y-line self-capacitances present in the intersections included in the area of the contact, where K is a real number greater than zero, and
an absolute value of the first voltage is 1/K times of an absolute value of the second voltage.

4. A capacitive touch panel comprising:
a plurality of x-line channels formed in a first direction;
a plurality of y-line channels formed in a second direction, different from the first direction, the plurality of y-line channels intersecting the plurality of x-line channels to form intersections, and the intersections include a first intersection group and a second intersection group; and
processing circuitry configured to
sense a contact on at least one of intersections,
apply a first voltage to intersections included in the first intersection group, and
apply a second voltage to intersections included in the second intersection group, the first voltage and the second voltage having the same phase,
determine that a part of a human body, being in contact with the capacitive touch panel, is affected by a voltage applied by the processing circuitry,
switch from applying the first voltage to the intersections included in the first intersection group to applying a third voltage to the intersections included in the first intersection group and switch from applying the second voltage to the intersections included in the second intersection group to applying a fourth voltage to the intersections included in the second intersection group, the third voltage and the fourth voltage having opposite phases to each other.

5. The capacitive touch panel of claim 4, wherein the intersections included in the first intersection group, and the intersections included in the second intersection group, are alternately arranged in the first direction and the second direction.

6. The capacitive touch panel of claim 4, wherein
the first direction and the second direction are perpendicular to each other,
a sum of x-line self-capacitances present in the intersections included in the first intersection group included in an area of the contact, is K times of a sum of y-line self-capacitances present in the intersections included in the second intersection group, where K is a real number greater than zero, and
an absolute value of the first voltage is 1/K times an absolute value of the second voltage.

7. A method of driving a capacitive touch panel including a plurality of x-line channels extending in a first direction, and a plurality of y-line channels extending in a second direction, different from the first direction, the method comprising:
applying a first voltage to the x-line channels and a second voltage to the y-line channels, the first voltage and second voltage having the same phase;

determining that a part of a human body, being in contact with the capacitive touch panel, is affected by a voltage applied by the processing circuitry;

switching from applying the first voltage to the x-line channels to applying a third voltage to the x-line channels and switching from applying the second voltage to the y-line channels to applying a fourth voltage to the y-line channels in response to determining that the part of the human body is affected by the voltage, the third voltage and the fourth voltage having opposite phases to each other; and sensing a contact on at least one of intersections of the plurality of x-line channels and the plurality of y-line channels.

8. The method of claim 7, wherein, an interval between the plurality of x-line channels is K times an interval between the plurality of y-line channels, where K is a real number greater than zero, and an absolute value of the first voltage is K times of an absolute value of the second voltage.

9. The method of claim 7, wherein, a sum of x-line self-capacitances present in the intersections included in an area of the contact is K times of a sum of y-line self-capacitances present in the intersections included in the area of the contact, where K is a real number greater than zero, and an absolute value of the first voltage is 1/K times of an absolute value of the second voltage.

* * * * *